United States Patent

[11] 3,587,359

| [72] | Inventor | Robert M. McCash<br>Cincinnati, Ohio and,<br>Lervis A. Dever, Cincinnati, Ohio |
|---|---|---|
| [21] | Appl. No. | 792,926 |
| [22] | Filed | Jan. 22, 1969 |
| [45] | Patented | June 28, 1971 |
| | | Assignor to Cincinnati Milacron Inc.,<br>Cincinnati, Ohio |

[54] MACHINE TOOL
5 Claims, 8 Drawing Figs.

[52] U.S. Cl. .................................................. 77/3,
29/568
[51] Int. Cl. ......................................... B23b 39/00,
B23g 3/157
[50] Field of Search .......................................... 77/3;
29/568; 90/11.1; 318/463, 464

[56] References Cited
UNITED STATES PATENTS

| 2,713,138 | 7/1955 | Lanfers et al. ............... | 318/464 |
|---|---|---|---|
| 3,226,622 | 12/1965 | Benvenuto .................. | 318/464X |
| 3,254,567 | 6/1966 | Daugherty .................. | 90/11.1UX |
| 3,259,976 | 7/1966 | Bergstrom .................. | 29/568 |

Primary Examiner—Andrew R. Juhasz
Assistant Examiner—Leon Gilden
Attorney—Norman S. Blodgett ABSTRACT: This invention relates to a machine tool and, more particularly, to apparatus for stopping a spindle at a predetermined angularity.

INVENTORS
ROBERT M. M<sup>C</sup>CASH
LEWIS A. DEVER 3,587,359

MACHINE TOOL

BACKGROUND OF THE INVENTION

In the machining of workpieces, there are occasions when it is desirable that the tool lie at a definite, known angular relationship to the axis of the spindle. Such a situation exists, for instance, in the case of a boring tool where it may be necessary to withdraw the tool so that the cutting element passes along a longitudinal keyway, so that the dragline does not appear on the finished surface of the bore. This is also important in accurate boring, since hole size and uniformity are affected by the point where the cutting tool is located when it first makes contact with the rough hole. Attempts in the past to obtain this type of tool orientation have been less than successful because of the cost of the necessary equipment, difficulty of maintaining adjustment, etc. These and other difficulties experienced with the prior art devices have been obviated in a novel manner by the present invention.

It is, therefore, an outstanding object of the invention to provide a machine tool having a spindle which always stops in the same position of rotation.

Another object of this invention is the provision of a machine tool having a rotatable tool spindle which can be stopped with its cutting edge in a predetermined angular relationship to its axis.

A further object of the present invention is the provision of a machine tool having automatic spindle orientation that is simple and rugged in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a machine tool having a spindle adapted to carry a tool, having a housing in which the spindle is rotatably mounted, having a cam associated with the spindle and rotatable therewith, the cam having a concave zero position. A cam follower contacts the cam and is mounted in the housing for movement toward or away from the cam. An actuating means is provided to press the follower toward the cam at certain times to produce supplementary rotation of the cam and spindle from a random position to a position in which the follower resides at the said zero position of the cam.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
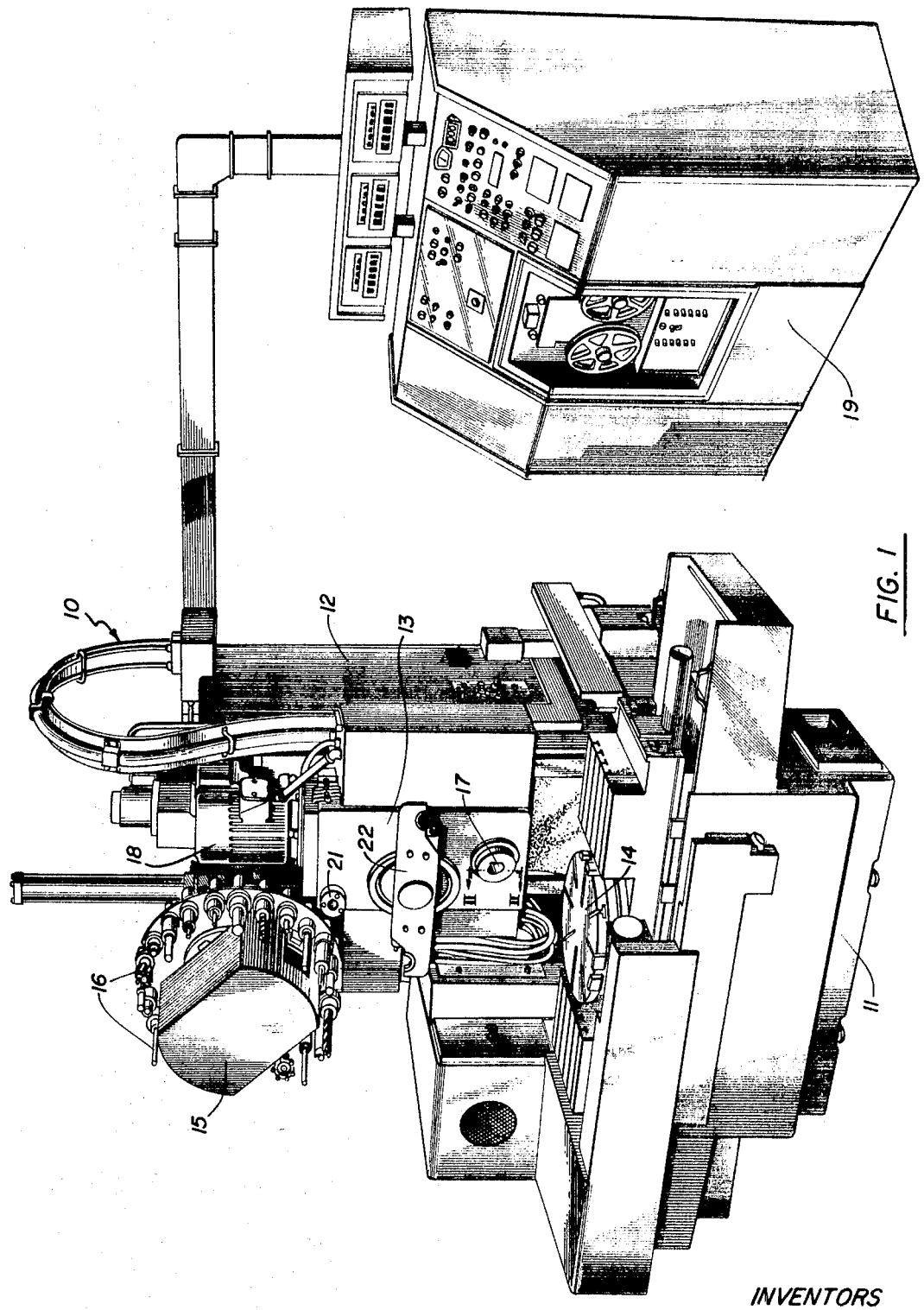
FIG. 1 is a perspective view of a machine tool incorporating the principles of the present invention.

Referring first to FIG. 1, which best shown the general features of the invention, the machine tool, indicated generally by the reference numeral 10, is shown as having a base 11 on which is mounted a column 12 which carries a housing 13. The base also carries a table 14 which is adapted to carry a workpiece (not shown). The column also carries a tool storage magazine 15 bearing a large assortment of tools 16. The housing 13 carries a rotatable spindle 17 which is driven by an electric motor 18. A numerical control console 19 is suitably connected to control the automatic operation of the various elements of the machine tool. The magazine 15 delivers the appropriate tool 16 to an intermediate position 21. A tool changer 22 is mounted on the housing 13 for pivotal motion about an axis parallel to the axis of the spindle lying midway between the position 21 and the spindle 17.

Figure 2:
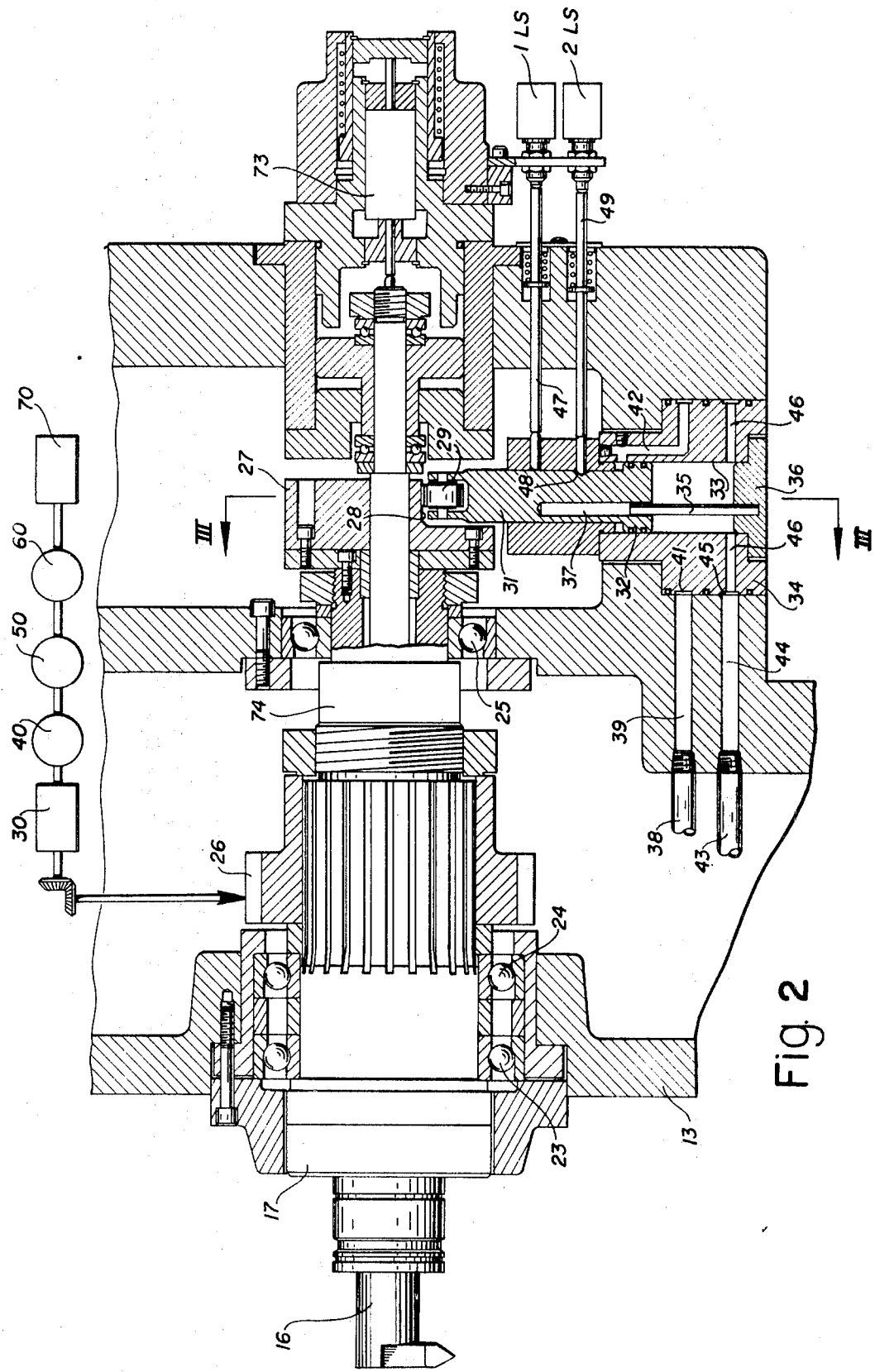
FIG. 2 is a sectional view of a portion of the machine tool taken on the line II-II of FIG. 1.

FIG. 2 shows the details of the spindle 17 and the manner in which it is mounted in the housing 13. Roller bearings 23, 24 and 25 support the spindle for rotation and a pinion gear 26 is provided for connecting it through a drive unit to a motor 70. Bolted to the spindle is a cam 27 having a surface 28 against which is pressed a cam follower or roller 29. The roller is mounted on one end of a rod 31, at the other end of which is formed a piston 32 slidable in the bore 33 of a cylinder 34. The axis of the bore 33 extends at a right angle to the axis of the spindle, and the rod 31 with its roller 29 is prevented from turning in the bore 33 by a nonconcentric pin 35 extending axially from a cylinder head 36 into a bore 37 formed in the piston end of the rod. A conduit 38 is connected to the housing 13 at a passage 39 which extends radially inwardly of the bore 33 to an annular groove 41 formed on the outside surface of the cylinder 34. This groove is, in turn, connected by a passage 42 to the interior of cylinder, i.e., to the surface of the bore where it normally opens to the space on the rod side of the piston 32. Another conduit 43 is connected through a passage 44 through the housing 13 to an annular groove 45 formed on the outer surface of the cylinder 34 at a position axially spaced from the groove 41. Radial passages 46 extend from the groove 45 into the bore adjacent the outer end thereof.

Slidably mounted in the housing 13 is a sping-biased plunger 47 associated with a switch 1LS; the other end of the plunger from the switch is in position to engage the surface of the rod 31, which surface is provided with a notch 48. Another spring-biased plunger 49 is mounted in the housing at a position spaced from the plunger 47 and serves to operate a switch 2LS; its inner end also engages the surface of the rod 31 and, on occasion, a bevel on the inner end of the rod near the roller.

Figure 3:
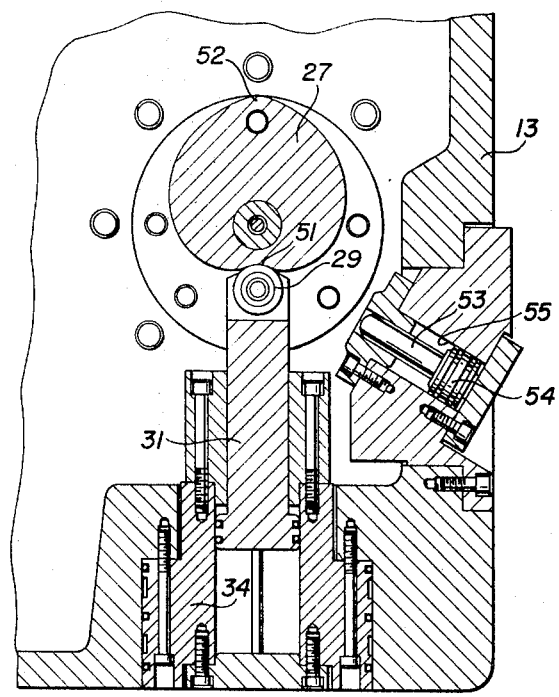
FIG. 3 is a sectional view taken on the line III-III of FIG. 2, FIGS. 4, 5 and 6 show the apparatus of FIG. 3 under various conditions.

Referring to FIG. 3, it can be seen that the cam 27 is heart-shaped and has a valley 51 located on one side and a point 52 exactly opposite. Located about 45° away from the line of action of the rod 31 and its roller 29 is a radially slidable plunger 53 which is movable under the impetus of a piston 54 operating in a cylinder bore 55. Suitable hydraulic connections are made to the opposite ends of the bore to introduce pressure oil to operate the piston and plunger.

Figure 7:
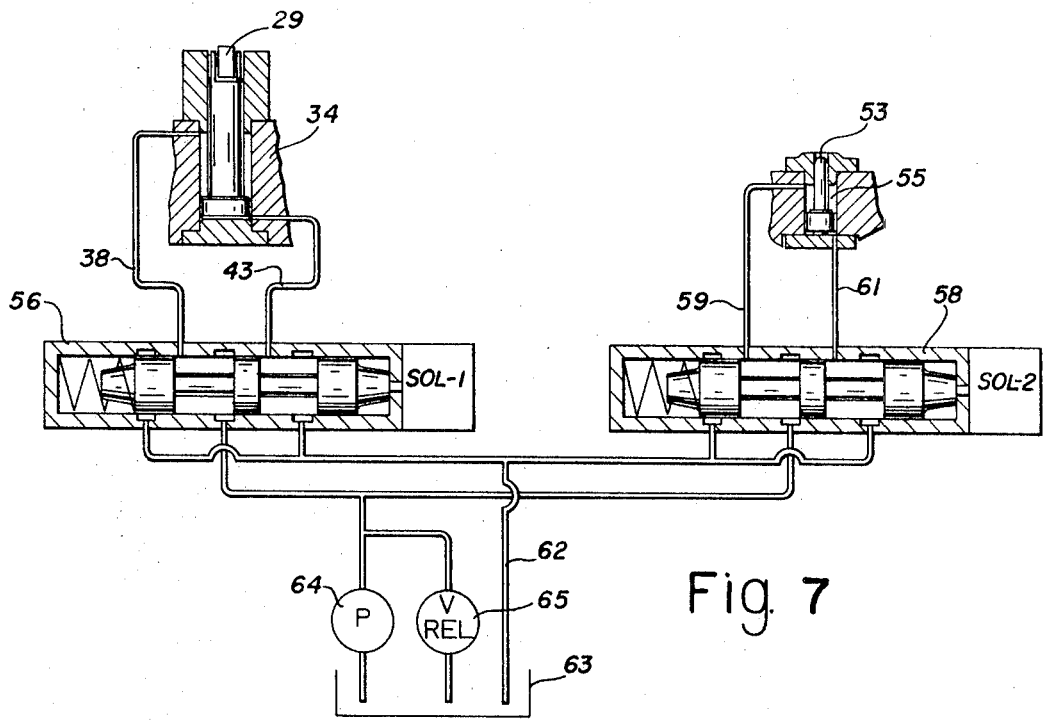
FIG. 7 is a schematic view of a hydraulic control used with the invention.

FIG. 7 shows the hydraulic circuitry associated with the machine tool, including a solenoid valve 56 having an actuating coil SOL-1 for serving the cylinder 34 through the conduits 38 and 43. A solenoid valve 58 having an actuating coil SOL-2 is connected to the plunger bore 55 through conduits 59 and 61. These valves are connected by a drain line 62 to a sump 63. They are also provided with pressure oil of regulated pressure by a pump 64 and a regulating valve 65.

Figure 8:
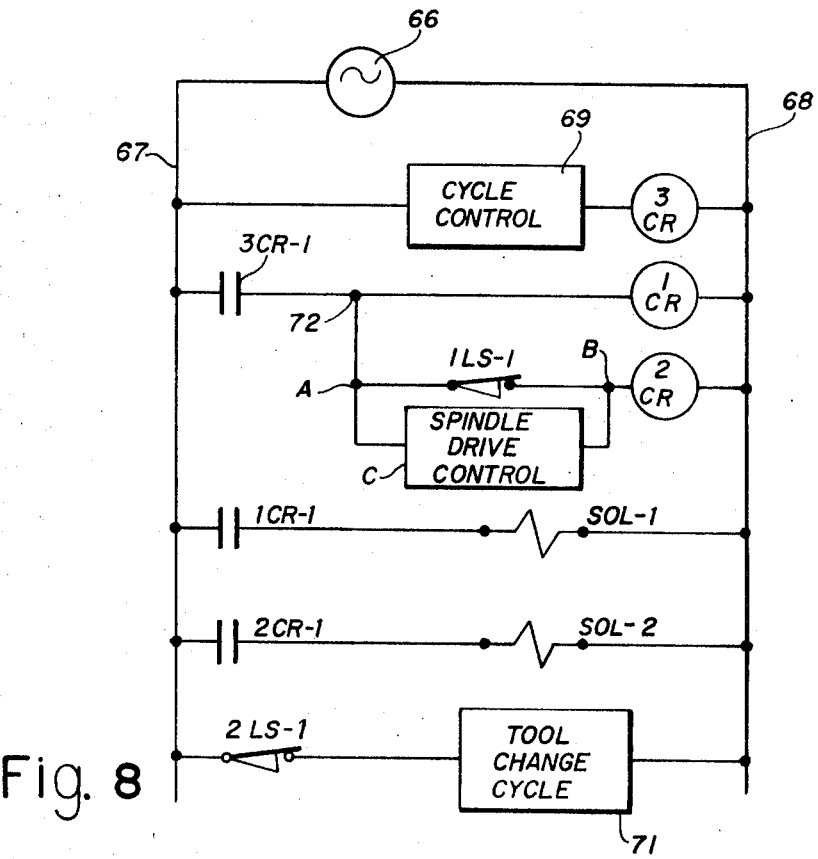
FIG. 8 is a schematic view of certain electrical equipment forming part of the invention.

FIG. 8 shows the electrical circuitry associated with the machine tool, including a source 66 of alternating current electricity feeding into main lines 67 and 68.

A cycle control box 69 is connected on one side to the main line 67 and on the other side through a relay coil 3-CR to the main line 68. The box 69 controls the energization of the relay coil 3-CR. A normally open contactor 3CR-1 of relay 3CR is connected on one side to the main line 67 and on the other side to a junction 72. The junction 72 is connected by a relay coil 1CR to the main line 68, and is also connected to a junction A. The junction A is connected to one side of a portion 1LS-1 of the unit switch 1LS. The other side of the switch 1LS-1 is connected to a junction B. The junction B is connected by a relay coil 2CR to the main line 68. The junction A is connected through a spindle drive control box C to the junction B.

A normally open contactor 1CR-1 of the relay 1CR is connected on one side to the main line 67. The other side of the contactor 1CR-1 is connected through the solenoid SOL-1 to the main line 68. A normally open contactor 2CR-1 of the relay 2CR is connected on one side to the main line 67. The other side of the contactor 2CR-1 is connected through the solenoid SOL-2 to the main line 68. A portion 2LS-1 of the limit switch 2LS is connected on one side to the main line 67 and the other side of 2LS-1 is connected through a tool change cycle box 71 to the main line 68.

OPERATION

The operation of the invention will now be readily understood in view of the above description. Let us assume that the machine tool is operative in machining a workpiece. The spindle 17 is rotated by the engagement in the usual way of the gear 26 with a drive means, such as a motor and transmission. After the machining operation has been completed, it is important that the spindle be stopped in a predetermined position of rotation. For instance, if the tool 16 is a boring tool, as shown, it is important that the cutter be directed toward a certain position in the bore before the spindle is withdrawn. This position may be the line along which a keyway is to be formed and removing the spindle and tool along this line means that the dragline or scratch will be removed by the machining of the keyway.

As the spindle stops and is disengaged from the spindle gear drive, the cycle control box 69 causes the relay coil 3CR to be energized. The contactor 3CR-1 closes and energizes the relay coils 1CR and 2CR. The contactors 1CR-1 and 2CR-1 close and energize the solenoids SOL-1 and SOL-2 respectively. This advances the rod 31 and the plunger 53 inwardly to engage the cam 27. A portion 1LS-1 on the limit switch 1LS is so connected (FIG. 8) that the opening of the switch contacts will deenergize the relay coil 2CR, thereby deenergizing the solenoid SOL-2. Whenever this occurs, the plunger 53 is retracted from the cam 27.

Referring to FIG. 3, if the spindle has stopped, by good fortune, at the exact, predetermined position, the roller 29 will lie at the exact bottom of the valley 51. It can be seen that, if the spindle stops fairly close to the desired position, the pressure of the roller on the side of the valley will cause the cam to rotate in one direction or the other until the roller sits at the bottom of the valley. This rotation of the cam causes a similar rotation of the spindle and causes it to rotate to the said desired position.

Figure 4:
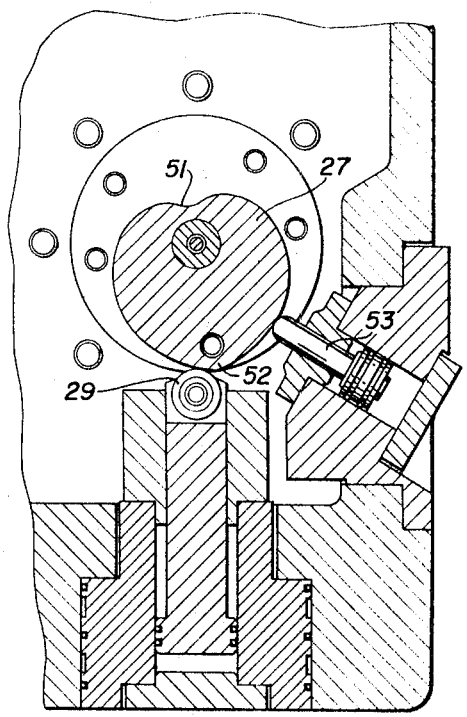
Figure 5:
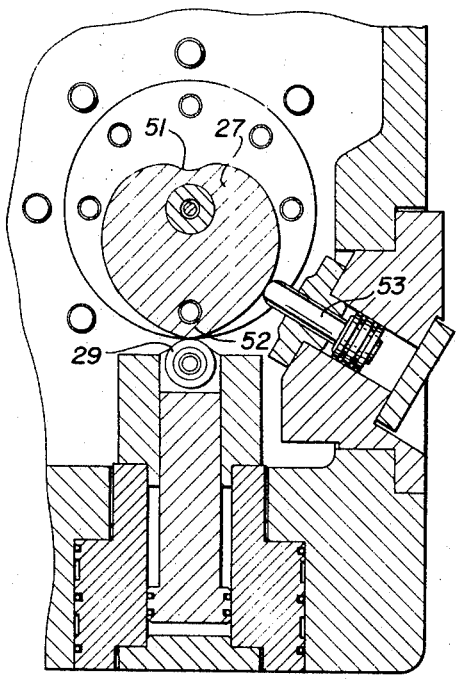

Referring to FIGS. 4 and 5, if the spindle stops with roller 29 pressing against the cam 27 adjacent to or at "top dead center" of the point 52, the pressure available to rotate the cam will be quite small. The position of rod 31 is such that contact 1LS-1 of the limit switch 1LS remains closed, thereby maintaining energization of the solenoid SOL-2. Then plunger 53 will complete its inwardly directed stroke to assist the start of cam rotation. The plunger 53 presses against the cam along a line which is spaced laterally from the centerline of the cam, thus producing a force couple which will rotate the cam; once the roller has moved from the zero slope area, it will rotate the cam and spindle in the usual way.

Figure 6:
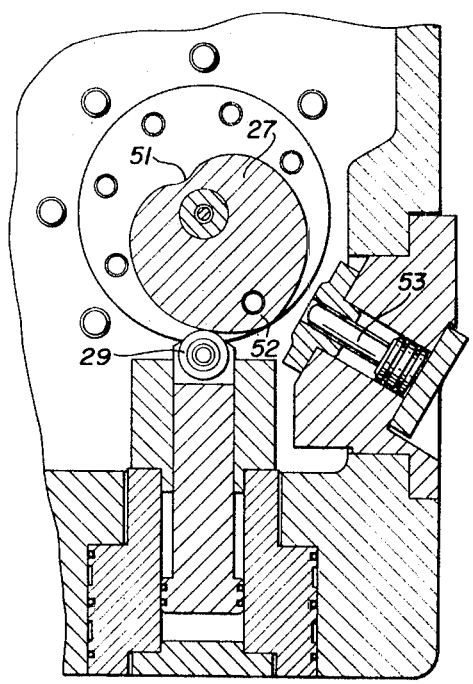

Referring to FIG. 6, if the spindle stops at a point where the roller 29 engages the cam 27 intermediate the valley 51 and the point 52, the pressure of the roller will cause the cam to rotate in one direction or the other until the roller sits at the bottom of the valley and causes a similar rotation of the spindle in the usual way.

In FIG. 2, the position of the rod 31 and the roller 29 is indicated by the actuation of the limit switches 1LS and 2LS. When the rod is located at the position shown, so that the spindle is in the desired position, the plunger 49 engages the notch 48. At that time, the switch portion 2LS-1 is closed and the tool change cycle is allowed to start. When the rod is located in an outer position (relative to the axis of the spindle), the plunger 47 falls into a reduced portion or bevel of the rod 31 near the roller 29. At this time, the switch portion 1LS-1 is closed and the spindle drive control C can be actuated.

When the speed of the spindle approaches zero, the spindle is separated from the rest of the spindle drive gears. The roller and cam, therefore, do not have to rotate the entire drive train. More specifically, the drive motor 70 also drives a tachometer 40 which generates a voltage indicative of the motor speed. This voltage is impressed on a voltage-sensitive relay 50 and, when the speed drops below a certain level, the relay starts a timer 60 and releases the spindle drive brake 30. The timer eventually times out causing the spindle drive control box C to separate the spindle from the rest of the drive gears.

It is obvious that minor changes maybe made in the form and construction of the invention without departing from the material spirit thereof. It is not, however, desired to confine the invention to the exact form herein shown and described, but it is desired to include all such as properly come within the scope claimed.

I claim:
1. A machine tool comprising:
   a. a spindle adapted to carry a cutting tool;
   b. a housing in which the spindle is rotatably mounted;
   c. a cam associated with the spindle and rotatable therewith, the cam having a contacting surface with a stop portion of zero slope and with a substantial portion of the remainder of said surface sloping toward the stop portion;
   d. a cam follower mounted in the housing for movement toward or away from the cam; and
   e. an actuating means to bring about the said movement so that it exerts a force on the surface of the cam, thus causing stoppage of rotation of the cam if the follower engages the stop portion and rotation if the follower engages said substantial portion of the remainder.
2. A machine tool as recited in claim 1, wherein the spindle is provided with a drive and wherein a clutch is provided to separate the spindle from the drive when the speed of the spindle is substantially reduced from a working speed.
3. A machine tool as recited in claim 1, wherein a drive motor is connected to the spindle through a hydraulically operated clutch, wherein a tachometer connected to the motor generates a voltage proportional to the drive motor speed, wherein a voltage-sensitive relay receives the voltage from the tachometer, wherein the relay operates when the motor slows to a predetermined speed and start a timer, and wherein a solenoid valve is operated when the timer times out to reduce the flow of hydraulic fluid to the clutch.
4. A machine tool as recited in claim 1, wherein a radial finger and actuator are mounted in the housing and angularly separated from the follower to provide rotation of the cam if it should stop with the follower on dead center.
5. A machine tool, comprising:
   a. a spindle adapted to carry a cutting tool;
   b. a housing in which the spindle is rotatably mounted;
   c. a cam associated with the spindle and rotatable therewith, the cam having a concave zero position;
   d. a cam follower contacting the cam and mounted in the housing for movement toward or away from the cam;
   e. actuating mans to press the follower toward the cam at certain times to produce supplementary rotation of the cam and spindle from a random position to a position in which the follower resides at the said zero position of the cam;
   f. a radial finger mounted in the housing and angularly separated from the follower to produce additional rotation of the cam; and
   g. a finger actuating means which causes said radial finger to bring about additional rotation of the cam if the rotation of the cam stops with the follower on dead center.